United States Patent [19]

Skroch

[11] Patent Number: 4,577,590

[45] Date of Patent: Mar. 25, 1986

[54] WILD MOUSE CAT SCRATCH POLE

[76] Inventor: David D. Skroch, 2002 W. 13th, The Dalles, Oreg. 97058

[21] Appl. No.: 661,752

[22] Filed: Oct. 17, 1984

[51] Int. Cl.[4] .............................................. A01K 29/00
[52] U.S. Cl. ...................................................... 119/29
[58] Field of Search ....................................... 119/29, 1

[56] References Cited

U.S. PATENT DOCUMENTS

| | | | |
|---|---|---|---|
| 2,246,965 | 6/1941 | Yoder | 119/29 |
| 2,296,000 | 9/1942 | Ojalvo | 119/29 X |
| 2,833,244 | 5/1958 | Bohlman | 119/29 |
| 3,581,707 | 6/1971 | Cook | 119/1 |
| 3,727,583 | 4/1973 | Muraro | 119/29 |
| 3,993,027 | 11/1976 | Mullin | 119/29 |

*Primary Examiner*—Hugh R. Chamblee
*Attorney, Agent, or Firm*—Henderson & Sturm

[57] ABSTRACT

The present invention is an entertainment and exercise apparatus (10) for cats; wherein the apparatus comprises a housing unit (11) and a mouse suspension and retraction unit (12) including a simulated mouse member (26) moveably attached to the housing unit (11) and provided with a weighted member (26) that retracts the mouse member (26) and produces an audible sound through a sound producing means (31) at the point of full retraction.

4 Claims, 5 Drawing Figures

U.S. Patent   Mar. 25, 1986   4,577,590
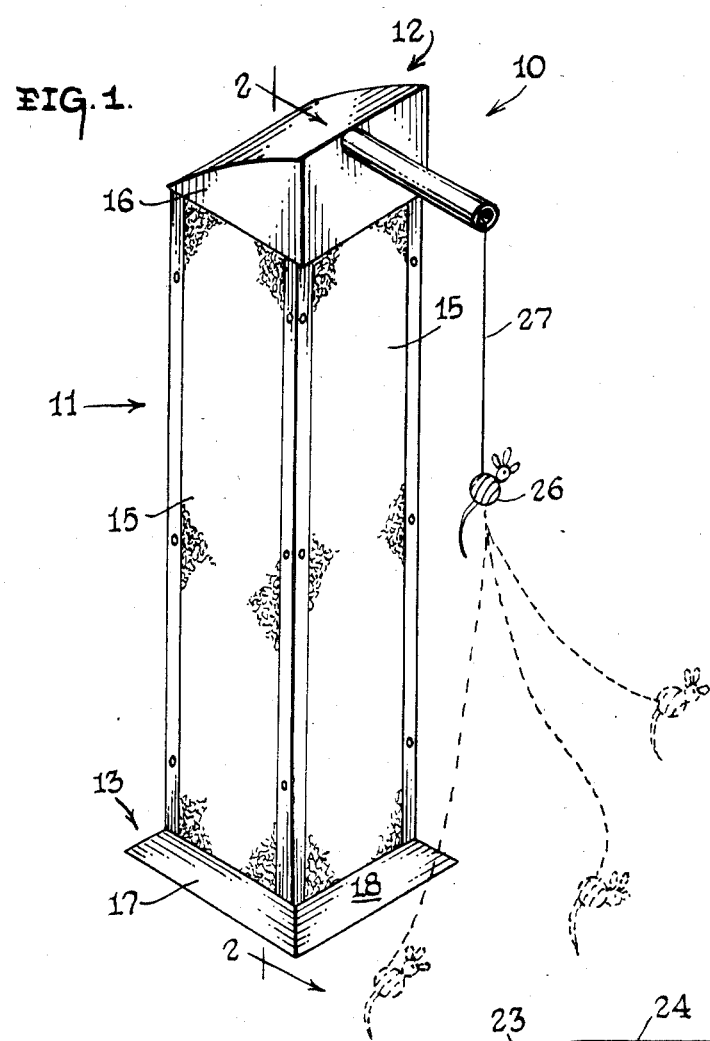
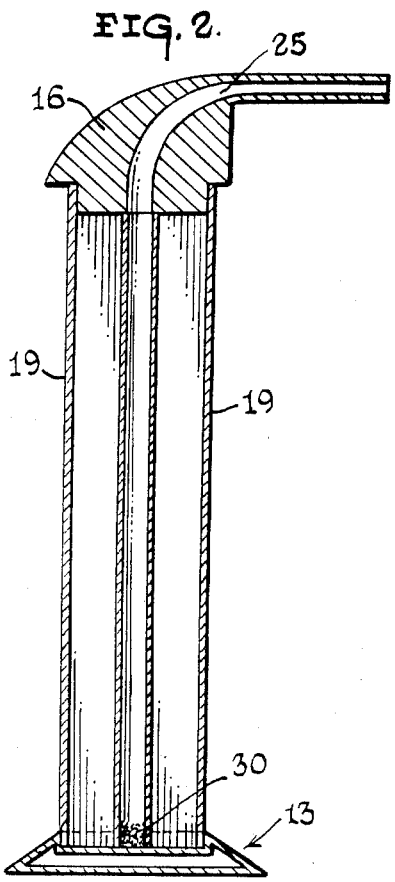
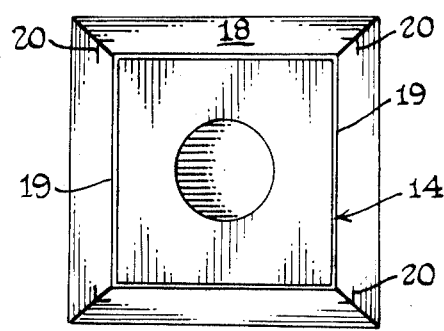
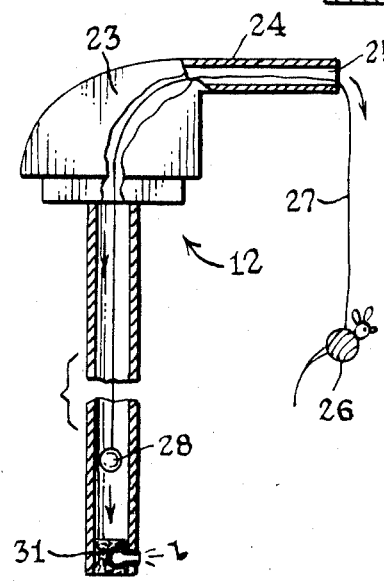
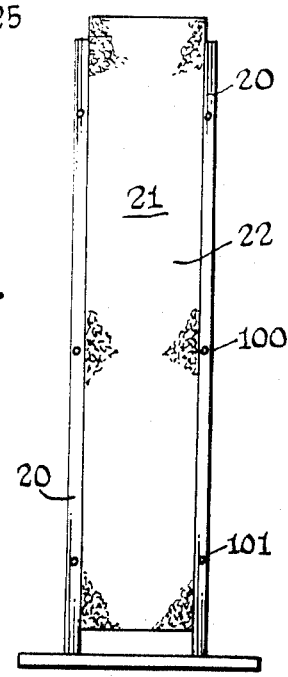

WILD MOUSE CAT SCRATCH POLE

TECHNICAL FIELD

This invention relates generally to the field of mechanized amusement devices used to exercise and entertain feline pets.

BACKGROUND OF THE INVENTION

As can be seen by reference to the following U.S. Pat. Nos. 3,727,583; 3,993,027; 2,833,244; 2,246,965, one of the more popular forms of amusement devices for cats involves a simulated mouse associated with a housing. The housing in turn is normally provided with a mechanical means that permits the mouse to be withdrawn from the vicinity of the housing by the cat, and which will retract the mouse once the cat releases its grasp thereon.

While all of the above mentioned prior art devices are adequate for this intended purpose; they are deficient in a number of respects. For example, most of the prior art devices are mechanically complex. Not only does that fact increase the cost of the apparatus, but also substantially increases the likelihood that the device will require repair or replacement of one of the parts.

Another noticeable drawback of the prior art devices is the fact that they do not provide a great deal of flexibility as to dual function or multiple use. Basically, the prior art devices serve a single purpose and their desirability from a consumer's standpoint is proportionately limited.

Up until the development of the present invention, the prior art merely consisted of a collection of limited use individual items, which while having an initial appeal for the pet owner soon exposed their inherent deficiencies and lack of utility.

BRIEF DESCRIPTION OF THE INVENTION

The provision of the present invention overcomes all of the deficiencies found in the prior art devices. The present invention includes in general a housing unit and a mouse suspension and retraction unit. The housing unit includes a base element, a framework element, removeable fabric covered panel elements, and a cap element.

The mouse suspension and retraction unit includes in general a shaft element that acts as a guide for a weight element that is operatively attached to a simulated mouse via a lanyard or cord. In addition the shaft element is provided with a resilient pad containing a sound producing means.

The simulated mouse is filled with an attractant, such as catnip or the like, to draw the cat's attention. When the cat grasps the simulated mouse, the weighted tethered connection allows the cat to pull the mouse a given distance away from the housing unit. Once the cat releases the mouse, the weight will drop down the shaft retracting the mouse back to the housing, while also creating an audible sound when the weight contacts the resilient pad. These combined actions will normally produce an immediate and prolonged response from the cat.

The fabric covered panel elements serve as a scratching post structure, that functions in a well recognized manner; as well as producing vibratory motion to the suspended mouse. The "jiggling" motion of the mouse created by the cat scratching one or more of panel elements produces an added enticement for the cat to "attack" the mouse.

BRIEF DESCRIPTION OF THE DRAWINGS

These and other objects, advantages, and novel features of the invention will become apparent features of the invention will become apparent from the detailed description of the best mode for carrying out the invention when considered in conjunction with the accompanying drawings, wherein:

FIG. 1 is a perspective view of the apparatus;

FIG. 2 is a cross-sectional view of the apparatus;

FIG. 3 is a top detail view of the housing unit;

FIG. 4 is an isolated detail view of the mouse suspension and retraction unit; and FIG. 5 is a detail view of the cooperation between the panel elements and the main frame member.

BEST MODE FOR CARRYING OUT THE INVENTION

As can be seen by reference to the drawings, and in particular to FIG. 1, the apparatus of the instant invention is designated generally as (10). The apparatus (10) includes in general a housing unit (11) and a mouse suspension and retraction unit (12). These units will now be described in seriatim fashion.

The housing unit (11) comprises a base element (13), a framework element (14), a plurality of panel elements (15), and a cap element (16). The base element (13) comprises a generally rectangular base plate (17) having outwardly tapered sides (18).

The framework element (14) is adapted to be secured to the base plate (17), and be disposed in a vertically upstanding relationship with respect thereto. The framework element (14) comprises an elongated hollow main frame member (19). In addition, the main frame member (19) is provided with a plurality of outwardly extending projections (20) that are spaced around its periphery, and adapted to engage a portion of the panel elements (15).

As shown in FIG. 3, the framework element (14) of the preferred embodiment has a generally rectangular configuration, and the outwardly extending projections (20) are disposed on the corners of the main frame member (19). It should be noted, however, that this invention is not to be limited to the particular configuration shown, and a circular or oval configuration would be equally suitable.

The panel elements (15) are configured and dimensioned to conform to the periphery of the main frame member (19), and adapted to be releasably received between opposed projections (20) on the main frame member (19). In addition, the panel elements (15) comprise fabric covered panel members (21) that are dimensioned to be slidingly received between the main frame member (19) and the projections (20), and are releasably secured therein via securing means (100) such as lock screws (101). The fabric covered panel members (21) are provided with a layer of fabric (22) that is suitable to be used as a scratching surface by a cat.

The cap element (16) is dimensioned to be received and supported within the top opening of the main frame member (19). The cap element (16) comprises a hollow cap member (23), having an elongated extension arm (24) projecting outwardly therefrom. The elongated extension arm (24) is provided with a narrow aperture (25) that houses a portion of the mouse suspension and retraction unit (12).

The mouse suspension and retraction unit (12) comprises a simulated mouse member (26) connected by a lanyard or cord (27) to a weighted member (28). In addition, the mouse suspension and retraction unit (12) also comprises an elongated shaft member (29), a resilient impact member (30), and a sound producing means (31).

The shaft member (29) is operatively disposed within the main frame member (19) and positioned beneath the inboard end of the narrow aperture (25) in the extension arm (24) of the cap member (23). The resilient impact member (30) is disposed at the bottom of the shaft member (29), and has an impact actuated sound producing means (31) operatively associated therewith, such as a whistle, or the like.

The lanyard (27) is connected on one end to the weighted member (28) which is slidingly disposed in the shaft member (29). The intermediate portion of the lanyard (27) is threaded through the narrow aperture (25), and the outboard end of the lanyard is attached to the simulated mouse member (26).

The weighted member (28) has a sufficient weight to suspend the simulated mouse member (26) from the outboard end of the cap member extension arm (24); however, the weight is chosen such that the cat can vertically displace the weighted member (28) within the shaft member (29) up to the point that the weight contacts the inboard end of the narrow aperture (25).

Once the cat releases its grasp on the mouse member (26), the weighted member (28) will drop down the shaft member (29). This in turn will produce the following effects: the mouse member will be quickly pulled back toward the cap member extension arm (24); the rapid retraction will in most instances propel the mouse against the panel element (15) closest to the extension arm (24) to cause the mouse member (26) to rebound off the panel element. These combined actions alone should be sufficient to trigger the pursuit impulse in the cat; however, in addition, and almost simultaneously with the mouse impacting the panel element, the weighted member (26) will strike the resilient impact member (30) to actuate the sound producing means (31).

The arrangement heretofore described produces an apparatus that will provide endless hours of entertainment and vigorous exercise for domestic felines. In addition, the construction described herein is so simple, that it is a virtually fail safe mechanism. The only part of this apparatus that could ever conceivably break, and render the device inoperative would be the lanyard (27), and it would be extremely simple to make the necessary repairs. In addition, the housing unit (11) is constructed such that the panel elements (15) may be quickly removed and replaced when they become worn out.

One last feature of this invention, that bears mentioning, is the fact that when the configuration of the main frame member (19) and the cap element (16) are circular, there will be relative rotary movement between these structural components. This relative movement will not only allow the cat to pull the mouse in a circle around the housing unit, but will also create additional reactive movement when the mouse member (26) is released by the cat.

Having thereby described the subject matter of this invention, it should be obvious that many substitutions, modifications, and variations of the invention are possible in light of the above teachings. It is therefore to be understood that the invention as taught and described herein, is only to be limited to the extent and breadth of the appended claims.

What I claim is:

1. An apparatus for providing entertainment and exercise for cats; wherein, the apparatus comprises:
   a housing unit including a base plate, an elongated main frame member, and a hollow cap element disposed on top of said main frame member, and having an elongated hollow extension arm projecting outwardly therefrom; and
   a mouse suspension and retraction unit including a weighted member connected by an elongated lanyard to a simulated mouse member; wherein the weighted member is moveably disposed within the main frame member, and the simulated mouse member is disposed outside the main frame member; wherein the housing unit further comprises a plurality of fabric covered panel elements releasably associated with the main frame member; and, wherein the main frame member is further provided with a plurality of spaced apart outwardly extending projections which are adapted to releasably secure said plurality of panel elements intermediate said projections and said main frame member.

2. An apparatus as in claim 1; wherein said cap element has an elongated narrow aperture formed in the elongated extension arm, and wherein the aperture is dimensioned to slidingly receive the said elongated lanyard.

3. An apparatus as in claim 2; wherein the housing unit further includes:
   an elongated hollow shaft disposed within the main frame member and dimensioned to slidingly receive the said weighted member; wherein the top opening of the hollow shaft is operatively associated with the said narrow aperture in the cap element.

4. An apparatus as in claim 3; wherein the bottom portion of said elongated hollow shaft is further provided with a resilient impact member and a sound producing means.

* * * * *